Figure 1:
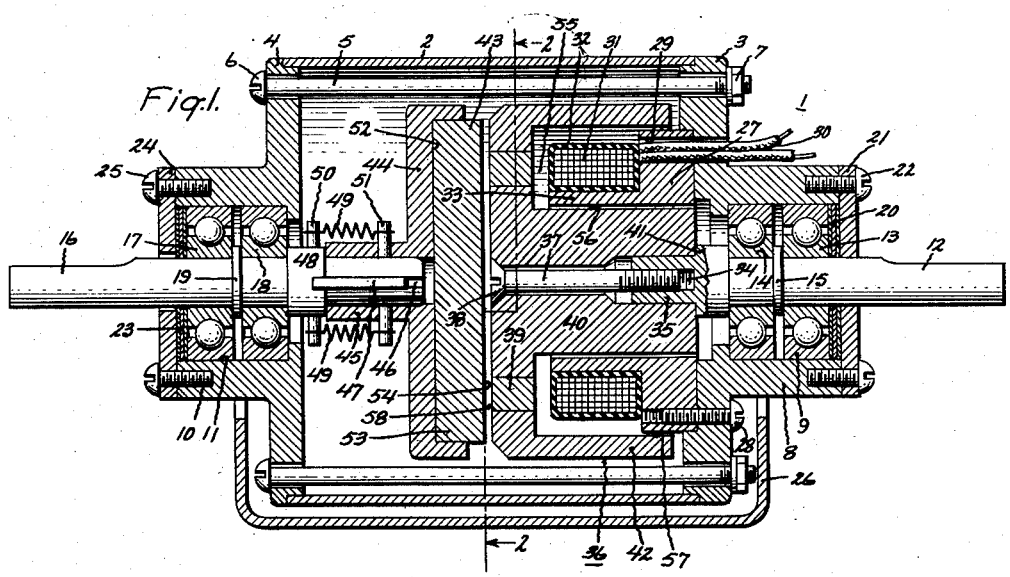

Feb. 3, 1959   K. M. FEIERTAG ET AL   2,872,001
MAGNETIC PARTICLE CLUTCH WITH BRIQUETTE CLUTCH MEMBER
Filed June 10, 1954

Inventors:
Karl M. Feiertag,
Hugh M. Stephenson,
by
Their Attorney.

United States Patent Office 2,872,001
Patented Feb. 3, 1959

2,872,001

MAGNETIC PARTICLE CLUTCH WITH BRIQUETTE CLUTCH MEMBER

Karl M. Feiertag and Hugh M. Stephenson, Fort Wayne, Ind., assignors to General Electric Company, a corporation of New York Application June 10, 1954, Serial No. 435,858

8 Claims. (Cl. 192—21.5)

This invention relates to clutch mechanisms and more particularly to an electromagnetic type of clutch.

Basically, electromagnetic clutches consist of a driving and a driven member, one of them having a coil formed thereon so that when current is applied to the coil, magnetic flux will be produced. The faces of both members are formed of magnetic material so that the flux will link the two parts of the clutch together to cause them to rotate as a unit. In all clutches, it is a well known fact that there will be a certain amount of slippage, and that this slippage will cause wear of the clutch faces. Also, in many types of electromagnetic clutches there is a magnetic fluid between the clutch faces which will bind them together when the magnetic flux passes through them, and cause them to rotate together. In the past, the magnetic material (such as powdered iron) between the clutch faces has been entirely separate from either of the clutch members, and has been mixed with a lubricant to form the magnetic fluid. Therefore, any loss of the magnetic material between the clutch faces necessitated immediate replacement. In addition, the presence of the lubricant limited the possible working temperatures of the clutch. Because of these factors, it will be seen that it would be highly desirable to provide a replacement supply of magnetic material between the clutch faces. In addition, it is desirable that this supply be continuous over a substantial period and that it come about automatically as a result of the interaction of the two clutch surfaces. Furthermore, it is deemed preferable to provide a clutch which will not necessitate lubricant with the magnetic material and will, therefore, be operative over a wide range of temperatures.

It is, therefore an object of this invention to provide an electromagnetic clutch having an improved clutching surface which will provide, in the amount needed, the magnetic material between the clutching surfaces and will be able to do so over a substantial period of time without necessitating replacement.

Further objects and advantages of this invention will become apparent and the invention will be better understood by reference to the following description and the accompanying drawing, and the features of novelty which characterize this invention will be pointed out with particularity in the claims annexed to and forming a part of this specification.

This invention, in one embodiment thereof, includes a pair of engageable clutch members, one of which may be adapted to be provided with means, such as an electrical coil, to produce a magnetic flux which will pass through the members. The face of one of the members is composed of a magnetic material, generally formed from a powder and pressed into a briquette under high pressure. While it is not essential, this briquette may be sintered if so desired. It will readily be apparent that such material will be highly frangible so that when there is engagement between the clutch surfaces due to magnetic attraction, the surface of the briquette will rub off as a fine powder. When magnetic flux is being produced this powder will form itself into a series of tiny chains binding the two surfaces together to move as a unit. When the electric coil is deenergized, the particles will continue to adhere to one of the clutch surfaces because of the residual magnetism therein. Thus, when the clutch is again utilized, the powder formed from the frangible briquette will still be readily available between the two surfaces and will again act to bind them together.

As soon as any of the powder should be lost for any reason, the surface of the frangible briquette will again be in contact with the surface of the other clutch member and additional powder will be rubbed off. It will thus be seen that under normal circumstances, a small amount of powder will rub off the briquette and that this small amount will be sufficient for many operations of the clutch. When for any reason whatsoever this powder is lost, an additional supply is readily available and is automatically brought out by the frictional engagement between the two clutch surfaces on the next operation. It will be seen that such an arrangement avoids substantially all wear on the clutch surfaces but that, if powder is lost, such a wearing action will be of short duration and the clutch surfaces will thereafter again be protected. Also, the facts that an adequate supply of powder is always provided, and that the powder is unlikely to be displaced or require a carrier, eliminate the necessity for a lubricant to "carry" the powder.

Figure 2:
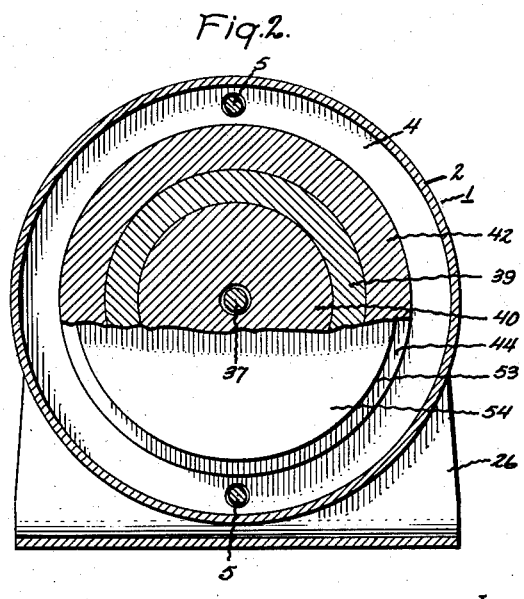

In the drawing, Figure 1 is a side view in cross section of a clutch embodying the improved features of this invention; and Figure 2 is a view along line 2—2 of Figure 1.

Referring now to the figures of the drawing, there is shown an electromagnetic clutch, generally indicated by the numeral 1. A cylindrical housing 2 is secured at each end to a pair of end shield members 3 and 4 respectively. This assembly may be fastened together by any preferred means such as, for instance, through-bolts 5 having heads 6 and nuts 7. Housing 2, end shield members 3 and 4, and through bolts 5 are preferably formed of non-magnetic material. End shield member 3 has a hub portion 8 with a bearing recess 9 while end shield member 4 has a corresponding hub 10 with a bearing recess 11. A shaft 12 is rotatably mounted in bearings 13 and 14 which are secured within recess 9, with a washer 15 being provided on shaft 12 to separate bearings 13 and 14. A separate shaft 16 is preferably axially aligned with shaft 12 and is rotatably mounted in bearings 17 and 18 within recess 11 of hub 10, with a washer 19 being provided on shaft 16 to maintain bearings 17 and 18 separate. Thrust washers 20 are slipped over the shaft 12 between bearing 13 and a closure member 21 which is secured to hub 8 by any desired means, such as screws 22. Similar thrust washer members 23 are provided for shaft 16 and a like closure member 24 is secured by means such as screws 25 to hub 10. The clutch 1 may be mounted on a base member 26 which is secured at each end to hub parts 8 and 10 respectively.

An annular portion 27 of magnetic material is secured to end shield 3 by any desired means, such as bolts 28, and an opening 29 is provided in member 27 and end shield member 3 for electrical leads 30 which connect a source of power (not shown) to an annular electric coil 31 which is enclosed in insulation 32 and is placed around part 33 of member 27. Shaft 12 has an internally threaded opening 34 at its end 35, and a member 36 is secured thereto by a bolt 37 having a head 38 and which is threaded into opening 34, or by any other desired means. Member 36 is entirely formed of magnetic material with the exception of an annular band 39 which is formed of some non-magnetic material, such as brass, and is formed with an annular recess 55 defining a central portion 40 and an outer flange 42. The central portion 40 of member 36 extends back within member 27 and coil 31, and abuts against a shoulder 41 on shaft 12, thereby positioning member 36 axially with respect to member 27 and end member 3. When member 36 is in position, flange 42 thereof extends back around the outside of member 27 and coil 31 so that they are positioned in recess 55. The gaps 56 and 57 between portion 40 and member 27, and flange 42 and member 27 respectively, are made as small as is reasonably possible in view of the rotation to which member 36 will be subjected while member 27 remains stationary. Radial surface 43 of members 36 forms a clutching surface.

A member 44, which may be of a material such as steel and cup-shaped as shown, is secured to shaft 16 so as to be rotatable therewith but axially movable with respect thereto. This may be achieved, as shown, by providing member 44 with a hub portion 45 having one or more keyways 46. A key 47 is provided on portion 48 of shaft 16 so that it extends beyond the end thereof into keyway 46. Key 47 should extend sufficiently into keyway 46 so that when member 44 is moved forward the maximum desired, the key will still fit in the keyway so as to lock member 44 into rotation with shaft 16. Member 44 is normally biased axially toward end shield 4 by means of a pair of springs 49, each of which have one end attached to a post 50 firmly secured to shaft portion 48 and the other end secured to a post 51 firmly secured to hub portion 45 of member 44. Secured within opening 52 of member 44 is a disc-like briquette 53 formed entirely of powdered magnetic material which has been compressed into a solid mass at a pressure preferably within 10 to 30 tons per square inch. While various magnetic materials may be used for the briquette, it has been discovered that pure powdered iron affords the advantages of excellent magnetic properties and of an economical and plentiful supply. While it is not essential, briquette 53 may be sintered after the compressing operation.

The operation of the improved magnetic clutch of this invention will now be explained. It will be assumed for purposes of illustration, that shaft 12 is the driving shaft while shaft 16 is to be driven. It will, however, be understood that these functions are interchangeable, and it would be just as convenient to have shaft 16 driving shaft 12 in the present embodiment. When coil 31 is energized through electrical leads 30, a magnetic flux path is set up starting with member 27 across gap 57 to flange 42. The flux will travel to surface 43 of member 36, and since the nonmagnetic gap occasioned by the presence of annular piece 39 is relatively large, the flux will travel across the smaller nonmagnetic air gap 58 to briquette 53, then back across the small gap 58 to interior part 40 of member 36, across gap 56, and back to member 27. Enough magnetic flux is produced to overcome springs 49, which are biasing member 44 away from member 36, and the surface 54 of member 53 will move into engagement with surface 43 of member 36.

In view of the fact that shaft 12 will be causing member 36 to rotate, it will be obvious that there will initially be a certain amount of slipping between surface 43 and surface 54. This rubbing contact will cause the surface 54 of member 53 to powder off, the powder being formed of pure, low reluctance magnetic material and, as is well known in the art, when coil 31 is energized, this powder will form itself into very small chains linking member 53 to member 36 thereby to cause the two members to rotate together. When coil 31 is deenergized, springs 49 will again pull member 53 away from member 36. Member 36, however, is formed of a material which has sufficient residual magnetism so that the powdered magnetic material will cling to surface 43 until coil 31 is again energized to link the two parts of the clutch. Springs 49 ensure the opening of the gap between surfaces 43 and 54 when coil 31 is deenergized so that there will be no drag between the members from the residual magnetism effect.

It will be seen that as soon as an adequate coating of the powder is formed, surfaces 54 and 43 will be subject to only the most insignificant amount of wear. If any of the powder should disappear from between the surfaces, as, for instance, where the clutch is not utilized for an extremely long period of time, all the replacement powder needed will be formed as soon as surface 54 again starts to rub against surface 43.

It will thus be seen that this invention provides a clutch surface which is always ready to furnish the necessary linking material between the clutch surfaces, and that normally only a small amount of the material is required over a long period of time. It will further be seen that if more material is needed, this is created automatically with only the slightest wear to the clutch member surfaces, and that the continuous provision of a supply of powder of magnetic material from a clutch surface eliminates the need for a lubricant carrier for the powder.

It will be apparent that many modifications are possible without a departure from the spirit of the invention: for instance, the general structure of the clutch might be completely changed with only the essential elements remaining and, instead of a single briquette, a plurality of small briquettes around the outer periphery might be utilized. It will further be apparent that, by restraint of either of the clutch members, this invention may be utilized for various functions such as, for instance, braking and dynamometer applications. It will, therefore, be apparent that while the invention has been explained by describing a particular embodiment thereof, improvements and modifications may be made without departing from the scope of the invention as defined in the appended claims.

What we claim as new and desire to secure by Letters Patent of the United States is:

1. A magnetic clutch comprising means for producing a magnetic flux, first and second rotatable clutch members with said second member being formed entirely of magnetic material, said members being positioned within the flux field of said means and respectively having surfaces arranged to be drawn toward each other at a predetermined flux strength thereby to cause said members to rotate together, said second member having a consistency such that relative slipping of said two surfaces will cause pure, low reluctance magnetic powder to be formed from the surface of said second member between said members, the material of at least one of said members having sufficient residual magnetism to cause the major part of the powder formed to cling to the surface of said one member after said means ceases to produce flux whereby the major part of the powder is retained to link said members in subsequent operations, said members constituting the sole torque transmitting means of said clutch and being linked solely by said magnetic powder after it is formed.

2. A magnetic clutch comprising means for producing a magnetic flux, a first rotatable clutch member of magnetic material, and a second rotatable clutch member formed entirely of powdered compressed magnetic material, said members being positioned within the flux field of said means and respectively having substantially parallel opposing surfaces arranged to be drawn toward each other at a predetermined flux strength thereby to cause said members to be rotatable as a unit, said second member having a consistency such that relative slipping of said two surfaces will cause pure, low reluctance magnetic powder to be formed from the surface of said second member between said members, the material of at least one of said members having sufficient residual magnetism to cause the major part of the powder formed to cling to the surface of said one member after said means ceases to produce flux whereby the major part of the powder is retained to link said members in subsequent operations, said members constituting the sole torque transmitting means of said clutch and being linked solely by said magnetic powder after it is formed.

3. A magnetic clutch comprising first and second rotatable clutch members, said first member being formed with a substantially flat surface perpendicular to the axis of rotation and comprising an annular outer flange of magnetic material, a center portion of magnetic material, and an annular band of non-magnetic material separating said flange and said center portion; electrical flux-generating means positioned between said flange and said center portion; said second member including at least one briquette of frangible powdered compressed ferrous material normally biased away from said first member and having a substantially flat surface opposite and parallel to said first substantially flat surface, said surfaces being arranged to be drawn toward each other upon energization of said electrical means so that said members are rotatable as a unit, relative slipping of said two surfaces causing ferrous powder to be formed from the surface of said second member, the magnetic material of said first member having sufficient residual magnetism to cause the major part of the powder formed to cling to the surface of said first member after said means ceases to produce flux whereby the major part of the powder is retained to link said members in subsequent operations, said members constituting the sole torque transmitting means of said clutch and being linked solely by said ferrous powder after it is formed.

4. A magnetic clutch comprising means for producing a magnetic flux, a first rotatable clutch member of magnetic material, a second rotatable clutch member comprising a non-magnetic cup-like member, and a frangible powdered compressed ferrous briquette secured within and extending from said cup-like member, said briquette and said first member being positioned within the flux field of said means and respectively having substantially parallel opposing surfaces arranged to be drawn toward each other at a predetermined flux strength, said briquette having a consistency such that relative slipping of said two surfaces will rub ferrous powder from the surface of said briquette whereby said powder will link said members together without further rubbing contact therebetween, the material of said first member having sufficient residual magnetism to cause the major part of the powder formed to cling to the surface of said first member after said means ceases to produce flux whereby the major part of the powder is retained to link said members in subsequent operations, said members constituting the sole torque transmitting means of said clutch and being linked solely by said ferrous powder after it is formed.

5. A magnetic clutch comprising means for producing a magnetic flux, a first rotatable clutch member of magnetic material, and a second rotatable clutch member comprising at least one frangible powdered compressed ferrous briquette, said briquette and said first member being positioned within the flux field of said means and respectively having substantially flat opposing surfaces arranged to be drawn toward each other at a predetermined flux strength, said briquette having a consistency such that relative slipping of said two surfaces will rub ferrous powder from the surface of said briquette whereby said powder will link said members together without further rubbing contact therebetween, the material of said first member having sufficient residual magnetism to cause the major part of the powder formed to cling to the surface of said first member after said means ceases to produce flux whereby the major part of the powder is retained to link said members in subsequent operations, said members constituting the sole torque transmitting means of said clutch and being linked solely by said ferrous powder after it is formed.

6. A magnetic clutch comprising means for producing a magnetic flux, a first rotatable clutch member of magnetic material, and a second rotatable clutch member being formed entirely of pure powdered compressed sintered ferrous material, said members being positioned within the flux field of said means and respectively having substantially flat opposing surfaces arranged to be drawn toward each other at a predetermined flux strength thereby to cause said members to be rotatable as a unit, said second member having a consistency such that relative slipping of said two surfaces will cause pure, low reluctance ferrous powder to be formed from the surface of said second member between said members, the material of said first member having sufficient residual magnetism to cause the major part of the powder formed to cling to the surface of said first member after said means ceases to produce flux whereby the major part of the powder is retained to link said members in subsequent operations, said members constituting the sole torque transmitting means of said clutch and being linked solely by said ferrous powder after it is formed.

7. An electromagnetic clutch comprising a housing, first and second clutch members rotatably mounted in said housing, said first clutch member being formed with a substantially flat surface perpendicular to the axis of rotation thereof and comprising an annular outer flange of magnetic material extending back from said surface, a center portion of magnetic material extending back from said surface, an annular band of non-magnetic material formed between said flange and said center portion and forming a part of said surface, electromagnetic coil means secured to said housing and positioned between said flange and said center portion behind said surface; said second clutch member including a briquette of frangible powdered compressed ferrous material having a substantially flat surface opposite and parallel to said first surface, said briquette being normally biased away from said first clutch member, said briquette being arranged to be drawn toward said first clutch member by magnetic attraction upon energization of said coil means so that said clutch members are rotatable as a unit, relative slipping of said two surfaces causing ferrous powder to be formed from the surface of said second member, the magnetic material of said first member having sufficient residual magnetism to cause the major part of the powder formed to cling to the surface of said first member after said means ceases to produce flux whereby the major part of the powder is retained to link said members in subsequent operations.

8. An electromagnetic clutch comprising a housing member and a pair of end closure members respectively secured to the ends of said housing member, first and second clutch members rotatably mounted in said end closure members respectively, said first clutch member being formed with a substantially flat surface perpendicular to the axis of rotation thereof, said first clutch member further comprising an annular outer flange of magnetic material extending back from said surface, a center portion of magnetic material extending back from said surface, an annular band of non-magnetic material formed between said flange and said center portion and forming a part of said surface, electromagnetic coil means mounted on said one end member between said flange and said center portion behind said surface; said second clutch member comprising a steel cup member mounted to rotate on the same axis as said first clutch member, and a frangible powdered compressed sintered ferrous briquette secured within and extending from said cup-like member, said briquette having a substantially flat surface opposite and parallel to said first surface, spring means biasing said second clutch member away from said first clutch member, said second clutch member being arranged to be drawn toward said first clutch member by magnetic attraction upon energization of said electromagnetic coil, said briquette having a consistency such that relative slipping of the two surfaces will rub ferrous powder from the surface of said briquette whereby said powder will link said members together without further rubbing contact therebetween, and whereby upon loss of said powder additional powder will be formed upon a subsequent relative slipping of said surfaces, the magnetic material of said first member having sufficient residual magnetism to cause the major part of the powder formed to cling to the surface of said first member after said means ceases to produce flux whereby the major part of the powder is retained to link said members in subsequent operations.

References Cited in the file of this patent

UNITED STATES PATENTS

| | | |
|---|---|---|
| 2,519,449 | Findley | Aug. 22, 1950 |
| 2,580,869 | Winther | Jan. 1, 1952 |
| 2,738,044 | Winther | Mar. 13, 1956 |

FOREIGN PATENTS

| | | |
|---|---|---|
| 556,182 | Great Britain | Sept. 23, 1943 |
| 936,562 | France | Feb. 23, 1948 |